United States Patent [19]
Warner et al.

[11] Patent Number: 5,323,460
[45] Date of Patent: Jun. 21, 1994

[54] ENHANCED SUBSCRIBER LINE INTERFACE CIRCUIT

[75] Inventors: Michael Warner, Warrenton, Va.; Lalit O. Patel, Mesa; Absar Naseer, Chandler, both of Ariz.

[73] Assignee: AG Communication Systems Corporation, Phoenix, Ariz.

[21] Appl. No.: 817,709

[22] Filed: Jan. 7, 1992

[51] Int. Cl.⁵ .......................... H04M 19/00
[52] U.S. Cl. ................. 379/399; 379/412; 379/339; 379/413; 379/322; 375/25
[58] Field of Search ............ 379/399, 412, 413, 339, 379/322, 414, 386, 318, 324, 252, 398, 377; 375/121, 25

[56] References Cited

U.S. PATENT DOCUMENTS

| | | | |
|---|---|---|---|
| 4,984,266 | 1/1991 | Smith | 379/399 |
| 5,163,090 | 11/1992 | Pawlowski et al. | 379/399 |
| 5,175,764 | 12/1992 | Patel et al. | 379/412 |
| 5,222,130 | 6/1993 | Pflueger et al. | 379/399 |
| 5,228,081 | 7/1993 | Warner et al. | 379/377 X |

Primary Examiner—James L. Dwyer
Assistant Examiner—Paul A. Fournier
Attorney, Agent, or Firm—Gregory G. Hendricks

[57] ABSTRACT

An enhanced subscriber line interface circuit for a digital switching system which includes a line configuration and protection circuit connection tot he subscriber line and to a thick-film hybrid module. The thick-film hybrid module comprises a high voltage interface circuit and a PCM conversion circuit. The high voltage interface circuit provides power to the subscriber line, converts received analog voice signals transmitted from the subscriber instrument into differential voltage voice signals and detects the subscriber lines status. The PCM conversion circuit is connected to the high voltage interface circuit and is disposed to convert received differential voice signals into PCM digital signals. A line control interface circuit receives control signals from a peripheral processor of the digital switching system, controls the operation of the circuits of the thick-film hybrid module, and receives subscriber line information from the high voltage interface circuit which it passes on to the peripheral processor. A time slot assignment circuit connected to the peripheral processor is arranged to develop and transmit to the PCM conversion circuit time slot assignment information and to connect the PCM digital signals from the enhanced subscriber line interface circuit to the digital switching system.

2 Claims, 9 Drawing Sheets

ENHANCED SUBSCRIBER LINE INTERFACE CIRCUIT

CROSS-REFERENCE TO RELATED APPLICATIONS

Cross reference is made to the following related Application entitled: "An Enhanced High Voltage Line Interface Circuit", (Ser. No. 07/599,537 filed Oct. 18, 1990); "A Hybrid Balance And Combination Codec Filter Circuit", (Ser. No. 07/599,533 filed Oct. 18, 1990); "An Over-Current Detector Circuit For An Enhanced Subscriber Line Interface", (Ser. No. 07/599,536 filed Oct. 18, 1990); and "A Ringing Signal Control Circuit For An Enhanced Subscriber Line Interface", (Ser. No. 07/599,534 filed Oct. 18, 1990), filed on the same date as the instant Application, and having a common assignee.

BACKGROUND OF THE INVENTION

1. Field of the Invention

The present invention relates in general to the field of telecommunications, and more particularly, to an enhanced Subscriber Line Interface Circuit (SLIC) architecture.

2. Description of the Prior Art

Subscriber line interface circuits are customarily found in the central office exchange of a telecommunications network. The SLIC weds the digital switching network of the central office exchange to a plurality of analog subscriber lines. The analog subscriber lines connect to subscriber stations or telephone instruments found at subscriber locations remote from the central office exchange.

The SLIC functions to supply power to a subscriber station and to transmit and receive voice signals between the digital switching network and the subscriber station.

Modern solid state SLICs are constructed using specialized integrated circuits. One such SLIC is described on pages 3–14 of the GTE Microcircuits Data Book, published in 1987. Such a construction dispenses with the need for inductive components in the analog end of the interface. The operating environment of the SLIC includes a necessity to provide high voltages and currents, used for analog voice transmission and substation signalling, as well as, low voltage digital logic signals used for the transmission of digital data between the SLIC and the digital switching network. The high voltage requirements of −48 V battery feed is accomplished using a specialized High Voltage Subscriber Line Interrace Circuit (HVSLIC). Such as the HVSLIC circuit described in patent application Ser. No. 445,516, filed Dec. 4, 1989, entitled "High Voltage Subscriber Line Interface Circuit", having a common assignee with the present invention.

The translation of the analog voice signals to PCM encoded digital signals and the interface of the PCM digital signals between the line circuit and the digital switching system is accomplished using a specialized integrated circuit known as a CODEC/FILTER. The CODEC/FILTER converts analog voice signals received from a subscriber line and the HVSLIC to PCM encoded digital signals. Similarly, PCM encoded digital signals from the digital switching system are converted into analog voice signals for transmission on the subscriber line. One such device is the commercially available as the CODEC/FILTER COMBO TM, TP30XX family of COMBO TM devices manufactured by the National Semiconductor Company.

The SLIC must also provide certain signalling and detection functions in order to allow the digital switching system to communicate with a subscriber station. These signaling and detection functions include ringing signal control, ring-trip and loop sense detection as well as detection of abnormal loop conditions.

These functions are normally provided by a low voltage companion circuit of the HVSLIC usually referred to as a Low Voltage Subscriber Line Interface Circuit (LVSLIC). One such LVSLIC circuit is described in U.S. patent application Ser. No. 445,826, filed Dec. 4, 1989, entitled "Control Circuit For A Solid State Telephone Line Circuit", having a common assignee with the present invention. The LVSLIC communicates via a data and address bus with a central controller of the digital switching system. Information pertaining to the status of the SLIC and the subscriber line are transmitted from the LVSLIC to the central controller. Operating commands from the central controller are received by the LVSLIC for execution by the SLIC.

Presently available SLICs conform to a circuit architecture that connects in combination an integrated circuit HVSLIC, an LVSLIC, and CODEC/FILTER with discrete components that provide subscriber line configuration and protection. This SLIC combination connects a single subscriber line to the central office exchange.

Such a SLIC is described in U.S. patent application Ser. No. 445,517, filed Dec. 4, 1989, entitled "A Solid State Telephone Line Circuit", having a common assignee with the present invention.

The SLIC just described is normally one circuit of a plurality of SLICs that are assembled on a line card. The line card connects a plurality of subscriber lines to the digital switching network. Typically, eight or more SLICs can be found on a single line card. However, each SLIC is susceptible to catastrophic damage due to the environment of the associated subscriber line, such as lightning strikes, power surges, etc. A failure of one SLIC circuit necessitates the replacement of the line card. It is advantageous therefore to be able to replace only those circuits of the line card that are damaged by the aforementioned environmental factors and not the entire line card.

Further, since the LVSLIC acts primarily as a local controller and signal detector between the central controller of the digital switching system and the HVSLIC and COMBO, a certain amount of economy in circuit components can be realized by removing the LVSLIC from the above mentioned combination. By placing the LVSLIC in a more central location the LVSLIC can provide control and detection functions to two or more HVSLIC and COMBO circuits.

Accordingly, it is an object of the present invention to provide a new and more effective SLIC architecture that can effectively and efficiently interface the digital switching network of a central office exchange to an analog subscriber line.

SUMMARY OF THE INVENTION

The above and other objects, advantages, and capabilities are realized in an enhanced subscriber line interface circuit for a digital switching system over which a connection is established between the digital switching system and a subscriber instrument, via a subscriber line. The enhanced subscriber line interface circuit of the present invention includes a line configuration and protection circuit, connected to the subscriber line, to a ring bus and to a test bus. The line configuration and protection circuit includes a destructive voltage protection circuit, which protects the subscriber line interface circuit from destructive voltages that may be induced onto the subscriber line. The line configuration and protection circuit further includes a ring relay, which connects ringing current transmitted over the ring bus, from a ringing generator to the subscriber line. The ringing current is used to signal the telephone instrument. A test relay applies test signals transmitted over the test bus from a test controller to the subscriber line interface circuit, or alternatively, to the subscriber line.

A thick-film hybrid module is connected to the line configuration and protection circuit and comprises in combination of at least a first high voltage interface circuit and a first PCM conversion circuit. The first high voltage interface circuit is further connected to a source of high voltage potential and includes a subscriber line power circuit that provides power from the source of high voltage potential to the subscriber line. The first high voltage interface circuit further includes a differential voltage circuit, which is disposed to convert received analog voice signals transmitted from the subscriber instrument to differential voltage voice signals, a detector circuit for monitoring the status of the subscriber line and circuits for activating the ring and test relays.

The first PCM conversion circuit is connected to the first high voltage interface circuit and to a source of voltage potential which is substantially less than the source of high voltage potential. The first PCM conversion circuit is arranged to receive the differential voice signals from the high voltage interface circuit and to convert the differential voice signals to PCM digital signals.

The thick-film hybrid module is further connected to a line control interface circuit that is located off the thick-film hybrid module. The line control interface circuit is also connected to the digital switching system via a control bus and is arranged to receive control signals from a peripheral processor of the digital switching system. The received control signals are used to operate the first high voltage interface circuit including the operation of the circuits for activating the ring and test relays. The control signals from the peripheral processor also operate the first PCM conversion circuit. Additionally, the PCM digital signals from the first PCM conversion circuit are passed to the line control interface. Finally, the line control interface circuit is arranged to receive status information from the detector circuit and to convey the status information to the peripheral processor over the control bus.

The subscriber interface circuit of the present invention further includes a time slot assignment circuit connected to the line control interface circuit, the control bus, and to a PCM bus of the digital switching system. The time slot assignment circuit connects the PCM digital signals from the line control interface circuit to the PCM bus for transmission to the digital switching system. Additionally, the time slot assignment circuit receives control information from the peripheral processor that is used by the time slot assignment circuit to generate PCM time slot synchronization signals for operating the first PCM conversion means.

In the present arrangement, the thick-film hybrid module contains two high voltage interface circuits and two PCM conversion circuits connected together as individual stand alone pairs. Each high voltage interface and PCM conversion circuit pair connects to a respective line configuration and protection circuit, thereby, permitting the connection of two subscriber lines to the thick-film hybrid module. Each module connects to a single line control interface circuit since the control interface circuit is capable of controlling two high voltage interface circuits and two PCM conversion circuits.

BRIEF DESCRIPTION OF THE DRAWINGS

A better understanding of the invention may be had from the consideration of the following detailed description taken in conjunction with the accompanying drawings in which.

DESCRIPTION OF A PREFERRED EMBODIMENT

Figure 1:
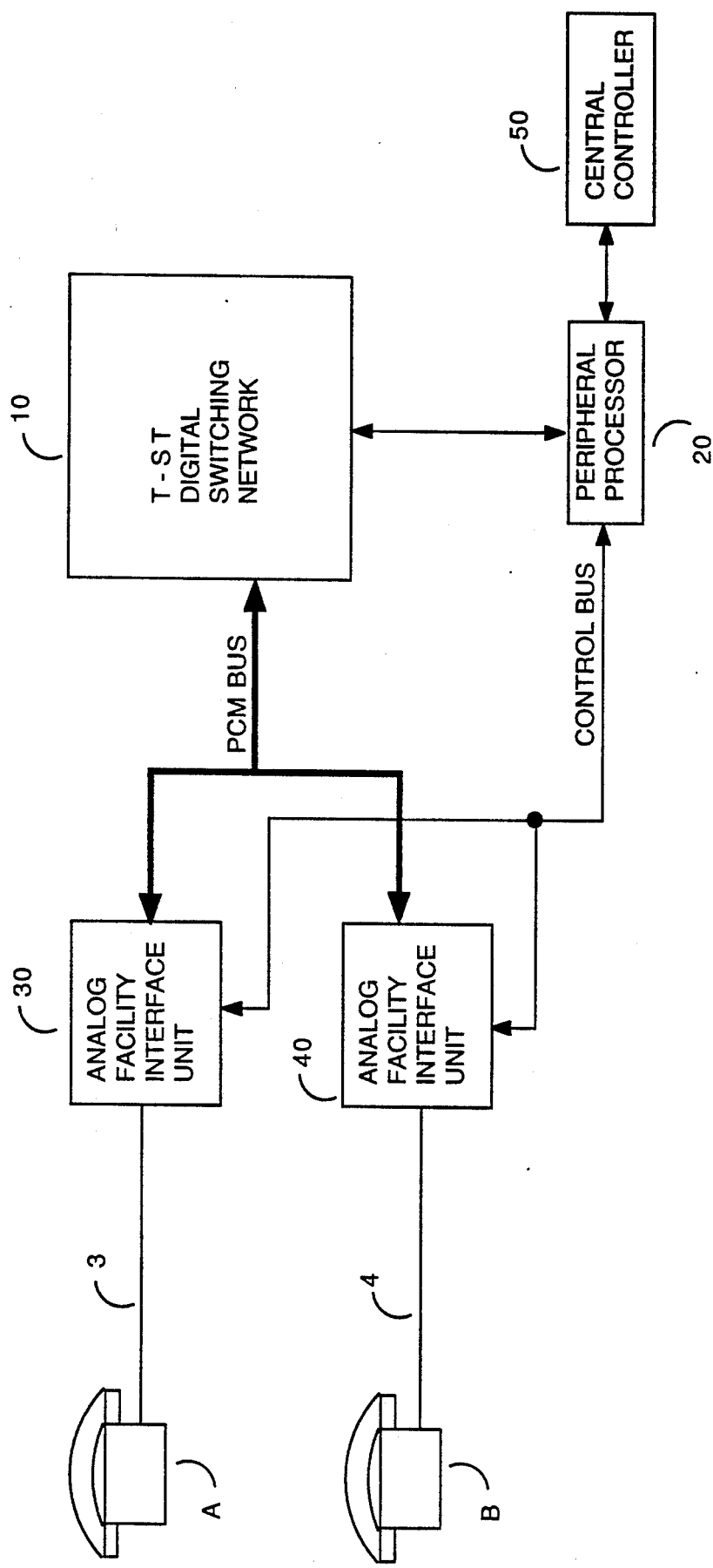
FIG. 1 is a simplified block diagram of a T-S-T central office switching system where the enhanced SLIC in accordance with the present invention is used to advantage.

Turning now to FIG. 1 of the included drawings a central office switching system or central office exchange of the type to which the invention is used to advantage is illustrated. The central office switching system includes a time division multiplexed Time-Space-Time (T-S-T) digital switching network 10 consisting minimally of an originating time switch and control unit, a space switch unit and a terminating time and control unit (not shown). The T-S-T network 10, connects to Analog Facility Interface Units (AFIU) 30 and 40 via a (Pulse Code Modulation) PCM BUS. Each AFIU 30 and 40 allows, in this embodiment, the connection of subscriber lines 3 and 4 respectively to the network 10. Subscriber lines 3 and 4 further connect to subscriber telephone instruments A and B, respectively. The network 10 and each AFIU 30 and 40 is further connected to a Peripheral Processor (PP) 20, via a CONTROL BUS. The PP 20 maintains control of its environment by scanning the AFIUs 30 and 40 and controlling the associated network time and control units. The total control of the network connections within the network 10 is the responsibility of the Central Controller (CC) 50. That is, the central controller 50, via the PP 20, informs the time and control units of the time switch connections and also informs the space switch unit of the space switch connections. In addition the CC 50 maintains a data base of the call processing and administrative software for the central office switching system. CC 50 is further arranged to receive control signals from PP 20 to control the operation of various portions of the HVLI and the HCOMBO. CC 50 is also arranged to receive status information from the detector circuit of the HVLI and to convey the status information over the control bus to PP 20. CC 50 is also arranged to receive PCM digital signals from the HCOMBO.

Analog voice signals from the transmitter of subscriber instrument A are transmitted to AFIU 30 where they are converted to PCM encoded digital signals. The PCM encoded digital signals are then inserted into available channels on the PCM BUS and transmitted to the digital switching network 10. Under control of the PP 20 the PCM encoded digital signals from subscriber A are switched through the digital switching network 10 and transmitted to AFIU 40 on the PCM BUS. The received PCM encoded digital signals are converted back to analog voice signals and transmitted via subscriber line 4 to the receiver of subscriber instrument B. The SLIC of the present invention is located within the AFIU.

Figure 2:
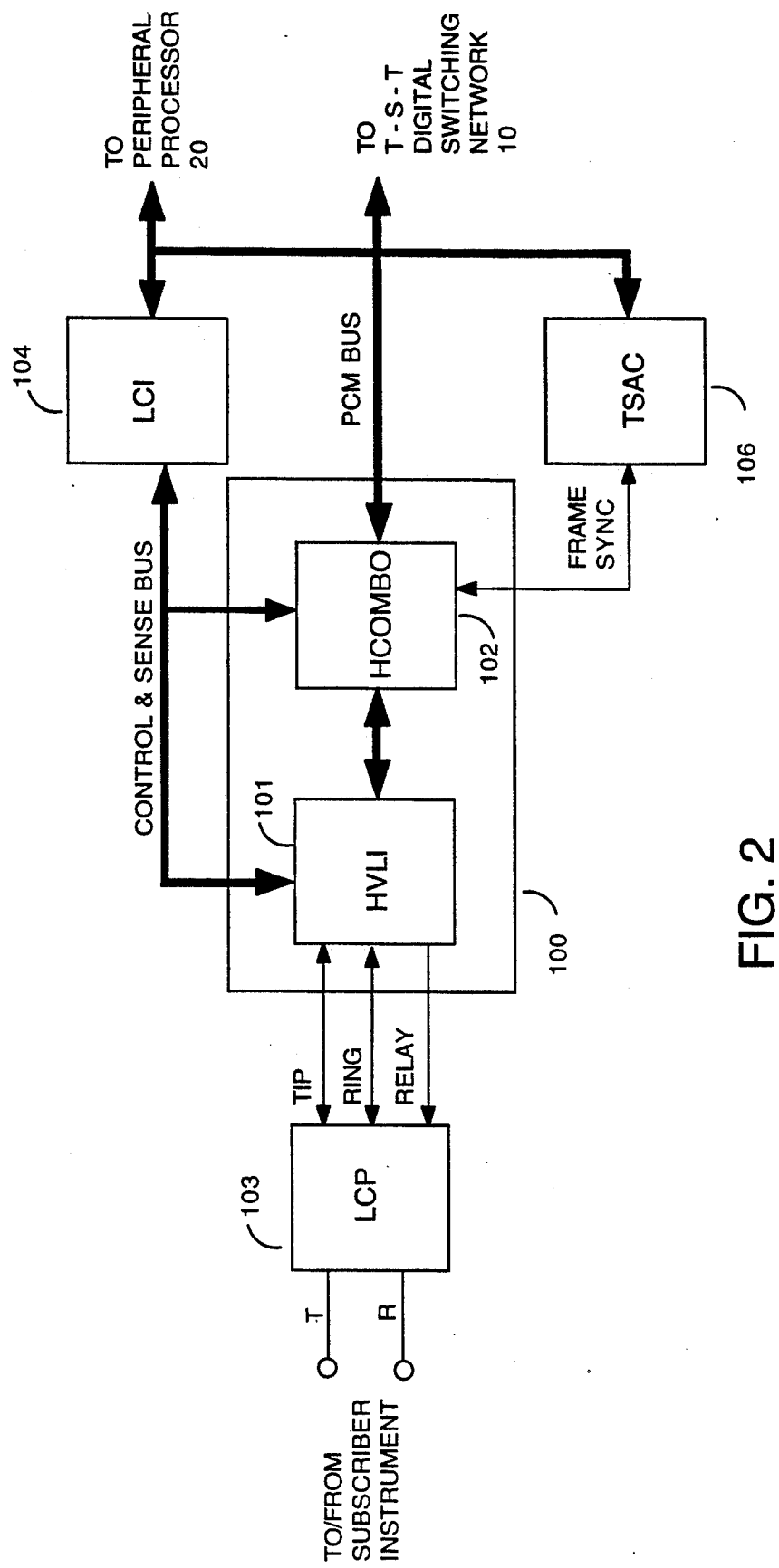
FIG. 2 is a block diagram of a line card including the enhanced SLIC in accordance with the present invention.

Turning now to FIG. 2 of the included drawings a block diagram of a line card including the enhanced SLIC in accordance with the present invention is shown. The line card shown in FIG. 2 includes eight SLICs. Each SLIC is arranged to interface a single subscriber line comprised of a Tip (T) lead and Ring (R) lead to the T-S-T digital switching network 10. The line card includes four thick-film transmission hybrid (XBRID) modules 100. All critical analog components of the SLIC are contained on the XBRID module 100. Each XBRID module 100 further includes two High Voltage Line Interface (HVLI) circuits such as HVLI 101 and two Hybrid Combo (HCOMBO) circuits such as HCOMBO 102 along with matched resistor networks and battery feed transistors (not shown). An HVLI 101 and a HCOMBO 102 form one functional SLIC that in combination provide most of the so-called BORSCHT-functions. In particular, the function of the subscriber power supply (Battery), line status monitoring (Signals, Supervision), analog-digital conversion (Coding) and filter functions and two wire-four wire transition (Hybrid) are provided by the HVLI 101 and HCOMBO 102 of each XBRID module 100.

In addition to powering the subscriber line, the HVLI 101 performs the essential two wire-four wire hybrid function of splitting the balanced signal on the T and R leads to separate transmit/receive paths. The differential audio signals are transmitted and received to/from the HCOMBO 102. The HVLI 101 further performs loop supervision, ring trip detection, ground sensing and over-current detection. A more detailed explanation of the electrical structure and operation of HVLI 101 may be had by reference to FIG. 3. The HVLI 101 circuit of present invention is shown in schematic form. HVLI 101 is constructed as a bipolar monolithic Integrated Circuit (IC) for the purpose of interfacing a standard two wire subscriber loop to a central office exchange. The IC includes the components within broken line 105. Transistor Q1, Q2 and the resistor capacitor network outlined by broken line 200, 201, 202 and 203, reside on XBRID 100 but are not a part of the internal architecture of the HVLI 101 circuit. The other line components associated with the Tip (T) and Ring (R) leads are contained within the LCP 103. These LCP 103 components are shown here to aid in the explanation of HVLI circuit 101.

The Tip Amplifier (TA) circuit 110 and Ring Amplifier (RA) circuit 111 function to feed dc and ac voltages and currents to the tip (T) and ring (R) leads respectively of the subscriber loop. The TA 110 works in conjunction with transistor 200 to form a transconductance amplifier that provides precisely controlled current drive to the T lead of the subscriber loop. TA 110 provides nominal loop current of 20–45 mA by controlling the base drive of transistor 200 via the TBASE lead. TA amplifier 110 and HVLI 101 are protected from destructive transient voltages by resistor 112. Resistor 112 is of a low ohmic value and is arranged to drop any large voltages or currents induced into the T lead. Such as transient voltage surges caused by lightning strikes.

Similarly, the RA amplifier 111 works in conjunction with transistor 201 to form a transconductance amplifier. RA 201 also provides a nominal loop current of 20–45 mA to the R lead of the subscriber loop by controlling the base of transistor 201 via the RBASE lead. RA amplifier 111 is protected from destructive transient voltages by resister 113. Resistor 113 is of a low ohmic value and is arranged to drop any large voltages or currents which may be induced into the R lead. Such as transient voltage surges caused by lightning strikes. A control voltage input into TA 110 and RA 111 is converted into output current at the T lead and R lead respectively, of HVLI 101. Further, TA 110 and RA 111 are each capable of sourcing or sinking current depending on the control input voltage.

The TA 110 and RA 111 circuits are connected to a Common-Mode Amplifier (CMA) circuit 115. CMA circuit 115 is used to sense the voltage across the subscriber loop. The output of CMA amplifier 115 is fed to TA 110 and RA 111. A representation of the common-mode voltage across the T and R leads is developed by a voltage divider network comprised of resistors 116 and 117. Resistors 116 and 117 are connected in series across the T and R leads of the subscriber loop. The voltage developed by the voltage divider is fed to the negative input of CMA 115 while the positive input is connected to a source of one half the central office battery voltage (VBAT/2). Resistors 116 and 117 are internal to the IC package of HVLI 101. When there is no common mode voltage, the CMA 115 circuit applies VBAT/2 to the TA 110 and RA 111 circuits. Further, CMA 115 is referenced to VBAT/2 such that the output of CMA 115 is of the same polarity and directly proportional to the common mode signal on the T and R leads. Additionally, CMA 115 synthesizes longitudinal (common-mode) input impedance at the T and R leads of HVLI 101 that is a virtual ac ground.

The sensing of tip lead current flowing within the subscriber loop, such when the T and R leads are connected together (responsive to a subscriber instrument going off-hook), is performed by the Tip Sense Amplifier (TSA) circuit 120. TSA 120 is a differential amplifier circuit that monitors the voltage across feed resistor 121. The output of TSA 120 is a linear voltage representing the absolute value of the T lead current. This voltage output is sent to Line Sensing circuit 150 where output signal LS (Loop Sense) is generated and sent to LCI circuit 104, signaling that current is flowing through the subscriber loop.

A Ring Sense Amplifier (RSA) circuit 125 identical to TSA 120 is also provided and is connected across feed resistor 126. RSA 125 senses ring lead current in the subscriber loop when the R lead is connected to earth ground (used in some multi-party phones). The output of RSA 125 is a linear voltage representing the absolute value of the R lead current. This voltage output from RSA 125 is sent to Line Sensing circuit 150.

A Tip Protection Amplifier (TPA) 130 and a Ring Protection Amplifier (RPA) 131 are connected across the T and R lead feed resistors 112 and 113 respectively, and are used to detect over-current conditions in the subscriber loop. This pair of differential operational amplifiers each monitor their respective leads of the subscriber loop and each develop an output signal that is linear and proportional to the current flowing through resistors 112 and 113. The signals from TPA 130 and RPA 131 are connected to line sense circuit 150 where they are analyzed to detect whether an over-current condition has occurred. When a loop current of 100 mA or greater is detected by TPA 130 or RPA 131, signal OVERSENSE is generated and transmitted to LCI circuit 104.

Voice signals from the subscriber instrument transmitter are represented as a difference voltage between the T and R leads of the subscriber loop. A Difference Amplifier (DA) 140 functions to buffer and amplify the voltage difference between the T lead and the R leads. The positive input of DA 140 is connected via the TSENSE1 line to the T lead, and the negative input of DA amplifier 140 is connected via the RSENSE1 line to the R lead. The voltage difference between the T and R leads sensed by DA 140 is converted into a single ended audio output and passed to Transmit Amplifier (TXA) 145. TXA 145 converts the received single ended audio signal to a fully differential form. The differential signal representations are passed to the HCOMBO 102 via VFTX− and VFTX+ for conversion to Pulse coded Modulation (PCM) digital data.

The sensing of a subscriber instrument going off-hook during a ringing cycle is the function of Ring Trip Amplifier (RTA) 155. RTA 155 is an operational amplifier referenced to VBAT/2, that monitors the voltage across resistor 156. When ring relay 157 is operated relay contacts K4A and K4B are made. This applies an ac ringing current to the T and R leads from RRB and RSB respectively of the ring bus. Dc current will not flow in the ring bus until the subscriber instrument hook-switch is closed (when the subscriber goes off-hook). The voltage dropped by resistor 156, in response to dc current flowing in the ring bus, is sensed by RTA 155 and a signal is output to Multiplexer (MUX) circuit 160. Resistors 158 and 159 provide protection to RTA 155 from large voltage values on the ring bus.

MUX 160 selects an analog signal from either RTA 155 or from Line Sensing circuit 150. The analog signal from Line Sensing circuit 150 is the differential output of RSA 125 and TSA 120 (ground sensing). The selection is made dependent on the status of the Ring Relay Enable (RNGRLYEN) signal input from the LCI circuit 104. RNGRLYEN is a logic signal that operates ring relay 157 when it transitions to a logic high logic signal. When RNGRLYEN is a logic low signal, MUX circuit 160 selects the ground sensing signal from RSA 125. When RNGRLYEN is a logic high signal the ring trip signal from RTA 155 is selected. The ground sensing or ring trip signal passed by MUX 160 is passed to Filter Amplifier (FLTRA) 161. FLTRA 161 is a low pass filter designed to attenuate the presence of 16.7 to 66.7 Hz from either the ground sense or ring trip signal input from MUX 160. Window Detector circuit 162 receives the output of FLTRA 161 and determines when the signal from FLTRA 161 is above or below a specific dc threshold. When the target threshold is exceeded, the presence of Ground Sense GS or Ring Trip RT is signaled to LCI 104 via the GS/RT lead.

The Battery Feed circuit 170 is arranged to provide a dc control voltage to the Differential Control Amplifier (DCA) 175, that sets the dc current level in the subscriber loop. The output of the DA 140 is summed with a precision reference (IREF) generated in the HCOMBO circuit 102 and VBAT/2, thereby, generating the dc output signal. The output of BATTERY FEED 170 is applied TO DCA 175 which supplies a bipolar drive voltage to TA 110 and RA 111 to control the subscriber loop current.

Audio signals intended to be output to the subscriber loop and the subscriber instrument receiver are received by HVLI 101 via VFRX− and VFRX+ from the HCOMBO 102. The signals received are in a fully differential form and are combined into a buffered single ended analog voice signal by the Receive Amplifier (RXA) circuit 180. The output signals of RXA 180 are applied to the positive input of TA 110 and the negative input of RA 111, were in conjunction with the drive voltage from the DCA amplifier, the analog voice signals are transmitted along the subscriber loop to the subscriber instrument receiver.

HVLI 101 also includes a Relay Buffer (RLYBUFFER) 190 comprising a plurality of relay drivers with open emitter outputs. The relay drivers of RLYBUFFER 190 are used to apply or remove a ground to relays 157 and 191–193. RLYBUFFER 190 receives a ground reference input EGREF from LCI 104 and relay enable signals that activate the respective connected relays. For example, when the ring relay enable signal RNGRLYEN is at a logic high level the RLYBUFFER outputs signal RNGRLY to relay 157 which operates contacts K4A and K4B, connecting the ring bus to the subscriber loop. All enable signals that operate relays 157 and 191-192 operate on logic high signals with exception of the Cut Relay (CUTRLY). When power to the LCI 104 and HCOMBO 102 is lost, but ground is still maintained, all relay outputs of the HVLI 101 will deenergize. A logic low level signal at CUTRLYEN will energize relay 191 breaking the connection of the T and R leads from the LCP 103, thereby, isolating HVLI 101 from the subscriber loop.

Figure 4:
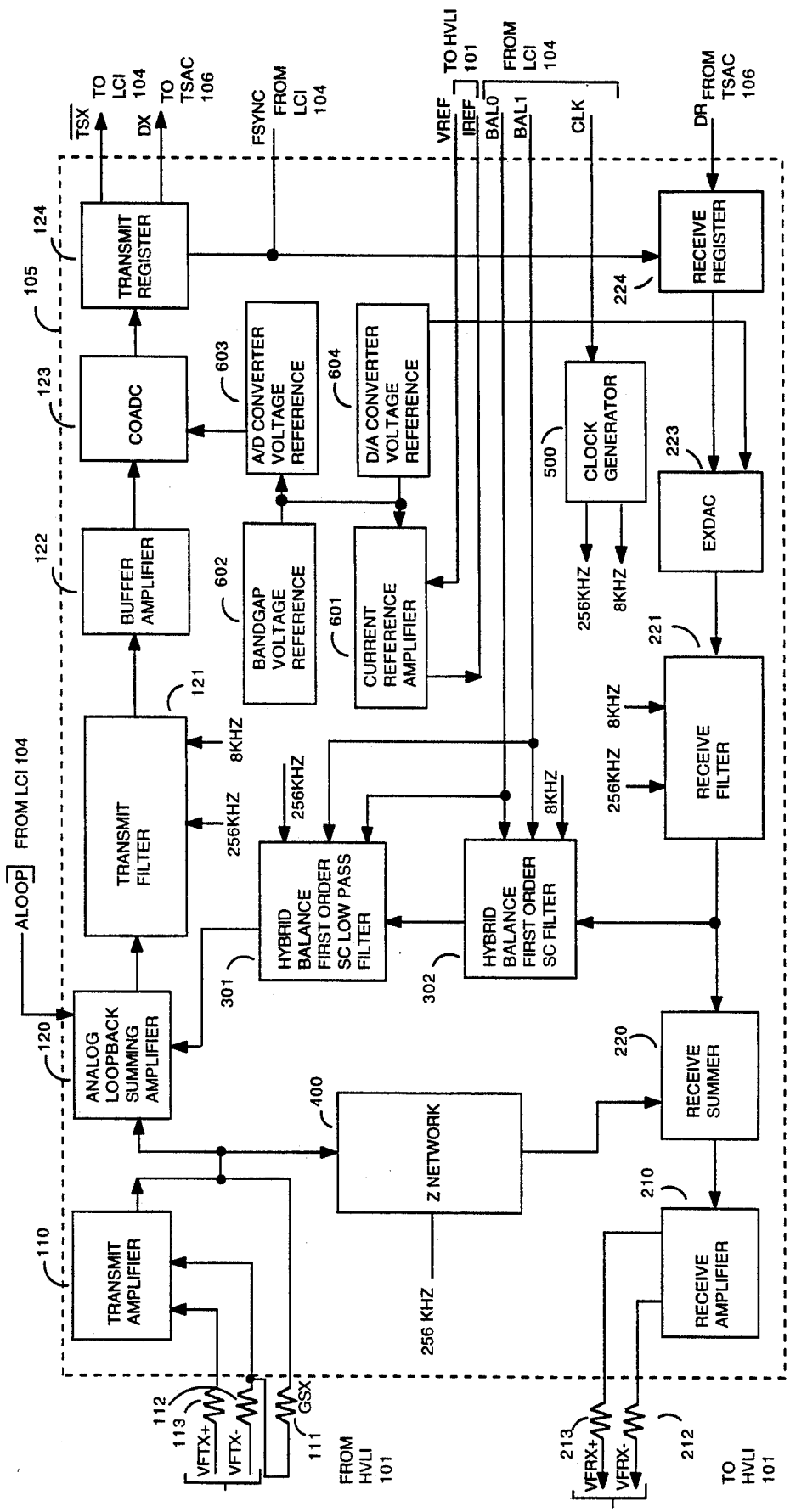
FIG. 4 is a functional block diagram of the hybrid balance and combination codec filter circuit of the present invention.

The HCOMBO 102 synthesizes the input impedance of the SLIC and performs hybrid balance echo cancelation. Additionally, the HCOMBO 102 converts the differential audio signals from the HVLI 101 to PCM encoded digital signals and from PCM encoded digital signals to differential audio signals. A more detailed explanation of the electrical structure and operation of HCOMBO 102 may be had by reference to FIG. 4. The HCOMBO 102 circuit of present invention is shown. HCOMBO 102 is constructed as a monolithic Integrated Circuit (IC) for the purpose of performing analog-to-digital and digital-to-analog conversion, impedance matching and hybrid balance echo cancellation in a subscriber line interface circuit. The HCOMBO IC includes the functions within broken line 105.

The HCOMBO of the present invention comprises a transmit section, a receive section, an impedance matching section, a hybrid balance echo cancellation section, a timing generator and a precision voltage and current reference section.

The transmit section is arranged to convert differential voltage audio band signals representing voice transmissions from a subscriber instrument, to PCM encoded digital data. This section includes a Transmit Amplifier circuit 110, an Analog Loopback Summing Amplifier circuit 120, a Transmit Filter circuit 121, a Buffer Amplifier circuit 122, a Companding Analog-to-Digital Converter circuit (COADC) 123, and a Transmit Register circuit 124.

The receive section converts PCM encoded digital data representing voice signals from the digital switching system to differential voltage audio band signals for processing by the HVLI 101 and transmission to a subscriber instrument. This section includes a Receive Register circuit 224, an Expanding Digital-to-Analog Converter circuit (EXDAC) 223, a Receive Filter circuit 221, a Receive Summer circuit 220, and a Receive Amplifier circuit 210.

The hybrid balance section connected between the transmit section and the receive section reshapes the audio band signals output from the Receive Filter circuit 221. This provides line balance and echo cancellation required by 2-4 wire conversions. This section includes a Hybrid Balance First Order Switched Capacitor Low Pass Filter circuit 301 and a Hybrid Balance First Order Switched Capacitor Filter circuit 302. The hybrid balance section can be configured to operate with loaded, non-loaded and 900 Ohm+2.16 $\mu$F subscriber lines and is selectable through the BAL0 and BAL1 input lines.

The impedance section is connected between the transmit section and the receive section of HCOMBO 102 and provides feedback between the Transmit Amplifier 110 and the Receive Amplifier 210. This section is comprised of an impedance (Z) network circuit 400 that generates a synthesized source impedance for the transconductance drive amplifiers found in HVLI 101.

The timing generator section includes a Clock Generator circuit 500 that generates a 256 KHZ and 8 KHZ timing signal from the CLK input. The generated timing signals are used within the HCOMBO 102 by the other sections of the HCOMBO.

The precision voltage and current reference section provides all of the precision voltage reference signals required by the COADC 123 and EXDAC 223 circuits. This section is comprised of a Current Reference Amplifier 601, a Bandgap Voltage Reference circuit 602, an Analog-to-Digital Converter Voltage Reference circuit 603 and a Digital-to-Analog Converter Voltage Reference circuit 604. The current reference amplifier 601 further generates a precision current (IREF) which is output for use by the HVLI circuit 101.

Figure 3:
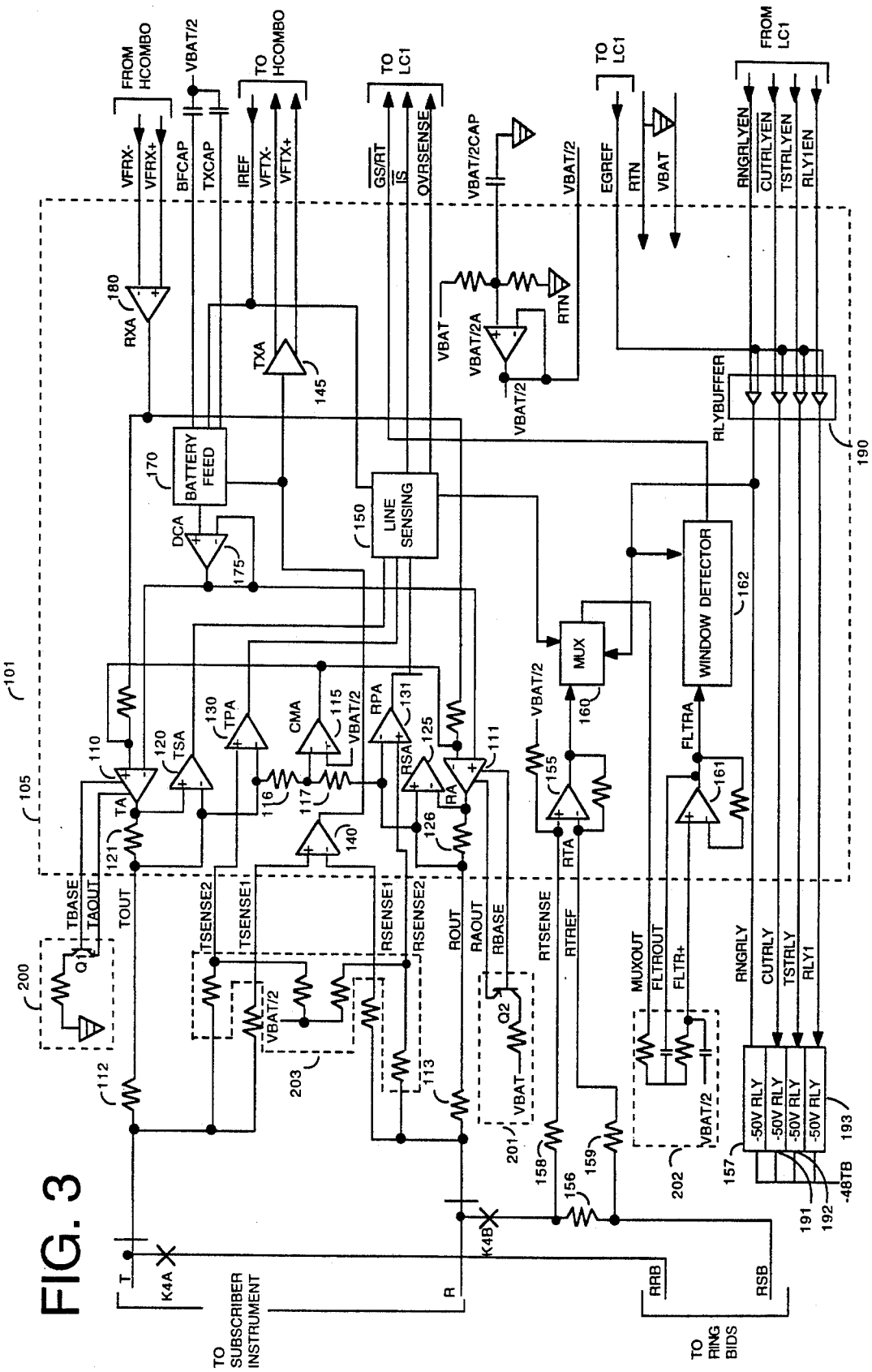
FIG. 3 is a schematic diagram of the enhanced high voltage line interface circuit in accordance with the present invention.

With renewed reference to FIG. 3 of the included drawings, a more detailed explanation of the functions of the HCOMBO 102 will now be given.

The first element in the transmit section is the transmit amplifier circuit 110. The transmit amplifier circuit 110 includes an operational amplifier with provisions for gain adjustment using external resistors. A differential voltage audio band signal from HVLI 101 is input to the transmit amplifier circuit 110 via the non-inverting VFTX+ and inverting input VFTX− inputs of the transmit amplifier 110. The amplifier is configured to achieve a bandwidth sufficient to allow a closed loop gain of better than 20 dB across the audio passband. The output of the transmit amplifier circuit 110 is routed out of the HCOMBO 102 at GSX where it is connected via external resistor 111 to the VFTX− input. Resistor 111 along with resistor 112 are specified to adjust the gain of the transmit amplifier circuit 110. External resistors 112 and 113 also serve as input current protection resistors for the circuit. The output of transmit amplifier 110 is a single ended audio band signal which is applied to the analog loopback summing amplifier circuit 120 and the Z-network 400.

The analog loopback summing amplifier circuit 120 includes a summing amplifier (not shown) that sums the output signal of the transmit amplifier 110 with the output of the hybrid balance section. Additionally, the summing amplifier is arranged to open the analog path between the transmit amplifier 110 and the input summing junction of the summing amplifier. When input signal ALOOP is at a logic high level the analog path between the transmit amplifier and the analog loopback summing amplifier is isolated. This allows a PCM code to be input at DR, converted to an analog signal by the receive section and fed back to the transmit section through the hybrid balance section, converted to PCM, and output on the DX output.

The signal output from the analog loopback summing amplifier 12 is next applied to the transmit filter circuit 121. Circuit 121 consists of an RC active prefilter followed by a sixth order lowpass switched-capacitor filter (not shown) clocked at 256 KHZ and a third order highpass switched-capacitor filter clocked at 8 KHZ (not shown). The clocks are derived from the clock generator circuit 500 and the master clock signal CLK.

The output of transmit filter 121 is buffered by buffer amplifier 122 before it is sent to the analog-to-digital converter COADC 123. The COADC 123 converts the input analog signal to an eight bit digital signal. The COADC 123 sample-and-holds the input analog signal companding in the $\mu$-law format. COADC 123 provides 13 bit resolution at low signal levels on the bottom chord of the companding characteristic. Any offset voltages due to the filters are cancelled by an included auto-zero circuit (not shown). The sampling of the filter 121 output begins on the rising edge of the frame sync pulse FSYNC and is followed by the analog-to-digital conversion.

The eight bit PCM digital data from the COADC 123 is loaded into the transmit register 124 for transmission to TSAC 106. The transmit register 124 is comprised of a parallel-to-serial converter circuit and an output driver circuit (not shown). The parallel-to-serial converter changes the eight bit PCM digital data from the COADC 123 from parallel to serial data format. The PCM serial data is clocked out of the transmit register 124 at output lead DX on the next eight CLK cycles immediately following the FSYNC signal. Signal TSX becomes active and pulses low for the eight CLK cycles as the 8-bit PCM digital data is shifted out of transmit register 124. The TSX signal is transmitted to LCI 104 signaling the LCI that analog-to-digital encoding is active. The encoded PCM digital data is output on DX to TSAC 106 for the subsequent transmission of the PCM digital data to the digital switching network.

An eight bit PCM coded representation of a voice signal from the digital switching system is input into HCOMBO 102 at the DR input of the receive register 224. The receive register 224 is comprised of a latch circuit and a serial-to-parallel converter circuit (not shown). The serial-to-parallel converter changes the eight bit PCM digital data received into a parallel data format. A rising edge on the frame sync pulse FSYNC causes the PCM serial data at DR to be latched into the receive register 224 on the next eight falling edges of CLK. The parallel PCM digital data is then clocked into the Expanding Digital-To-Analog (EXDAC) converter 223 for conversion into an analog signal. EXDAC 223 expands the decoded signal in accordance with the μ-law decoding format.

The decoded signal from EXDAC 223 is next applied to the receive filter 221. The receive filter 221 consists of a seventh order band-pass switched-capacitor filter and a third order RC active post-filter. The seventh order band-pass filter includes circuits for correcting the sin x/x attenuation inherent in 8 KHZ sample-and-hold decoding.

The output of the receive filter is applied to the hybrid balance section and to the receive summer circuit 220. The receive summer 220 sums the output signals from the receive filter 221 with the synthesized impedance developed by the Z network 400. The summed output of receive summer 220 is finally applied to receive amplifier 210.

Receive amplifier 210 consists of a differential output driver amplifier that converts the single ended audio band input signal from the receive summer 220 into a differential voltage audio band signal. The output of receive amplifier 210 is transmitted to HVLI 101 on the non-inverting VFRX+ and inverting VFRX− output leads. Resistors 212 and 213 provide current protection for the drive circuits of the receive amplifier 210.

The hybrid balance section of HCOMBO 102 comprises a first order switched-capacitor filter 302 clocked at 8 KHZ and a first order switched-capacitor low-pass filter 301 clocked at 256 KHZ. The hybrid conversion is accomplished by passing a portion of the audio band signal from the receive filter 221 to the hybrid balance section prior to being output from the receive amplifier 210. The filters 302 and 301 modify the audio band signal amplitude and phase providing an output signal which is equal in amplitude and opposite in phase to the reflected audio band signal. The reflected audio band signal, is that portion of the receive amplifier 210 signal which when passed through the HVLI 101 circuit and the tip and ring leads, is not completely transferred to the terminating impedance. The reflected audio band signal returns through the HVLI 101 and back into the HCOMBO 102 through the transmit amplifier 110. The hybrid balance section output is summed with the output of the transmit amplifier 110 in the analog loopback summing amplifier 120. When the Hybrid balance section output and the reflected audio band signal are equal in amplitude and opposite in phase the signals cancel each other providing the maximum trans-hybrid loss.

The hybrid balance section of the present invention is implemented to function in three different system terminations. When a logic low signal is applied to the BAL0 and BAL1 inputs, the hybrid balance section is configured to provide the hybrid balance function in non-loaded tip and ring terminations. A logic high signal applied to BAL0 and a logic low signal applied to BAL1 configures the hybrid network to operate in loaded terminations. A logic low signal at BAL0 and a logic high signal at BAL1 configures the network to operate with 900 OHM+2.16 μF tip and ring terminations. Similarly, a logic high applied to both BAL0 and BAL1 configures the balance network section to operate in a 900 OHM+2.16 μF system. The logic input signals BAL0 and BAL1 are input from LCI 104.

The Z Network 400 synthesizes a source impedance of 900 OHM+2.16 μF to match the impedance of the tip to ring leads. The impedance is derived by feeding the output of the transmit amplifier 110 to the Z network 400. In such feedback impedance networks the gains of the amplifiers in the receive and transmit sections are matched with specific values of resistance and capacitance to achieve the desired input impedance. A better understanding of this method of synthesized impedance may be had by reference to U.S. Pat. No. 4,961,219, titled "A Circuit For Synthesizing An Impedance Across The Tip And Ring Leads Of A Telephone Line Circuit", having a common assignee as the present invention.

The output of the Z network is summed with the output of the receive filter 221 in receive summer 220. The summed output of receiver summer 220 is then input to the receive amplifier 210 for transmission of the audio band signals and synthesized input impedance to the HVLI 101.

The remainder of the BORSCHT functions are provided by the Line Configuration and Protection (LCP) circuit 103, located off the XBRID module 100. The LCP 103 appears between the T and R leads of a subscriber line and the HVLI 101. The LCP 103 functions to provide overvoltage protection (Overvoltage), the application of ringing current to the subscriber line (Ringing) and testing of the subscriber line as well as the SLIC (Test). The LCP 103 contains ring relays which under software control inject ringing current from a ringing generator (not shown) to the subscriber line. Similarly the subscriber line as well as the SLIC can be isolated and tested via a test relay (not shown) that provides facility test (Out Test) and circuit test (In Test). The test relay allows the application of test signals from a test program which resides in the CC 50.

In a digital common logic area of the line card resides a plurality of Line Control Interface (LCI) circuits 104. Each LCI 104 performs all of the control and sense logic functions for the two SLICs of an associated XBRID module 100. In particular, each LCI 104 functions to administer and control the ringing and test relays, hook status reporting, dial pulse detection, ring trip, ground sensing, and over-current detection. Each LCI 104 connects its associated XBRID module 100 to PP 20 via a control and sense bus. A more detailed explanation of the ringing signal control circuit of LCI 104 may be had by reference to FIGS. 5, 6 and 7.

Figure 5:
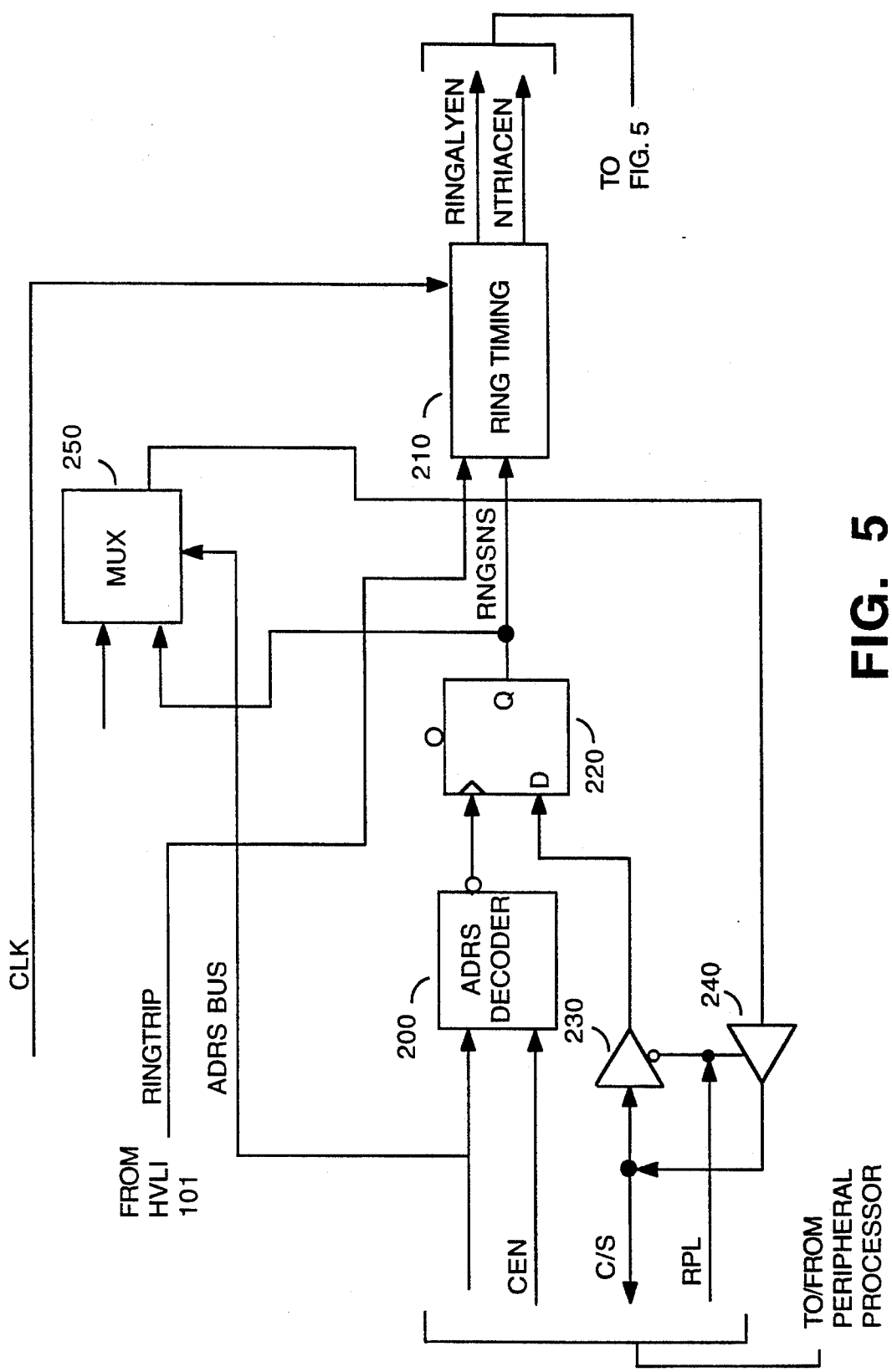
FIG. 5 is a functional block diagram of ringing signal control circuit in accordance with the present invention.

Turning to now to FIG. 5, of the included drawings, one copy of the two ringing signal control circuits found within LCI 104 is shown. LCI 104 is essentially memory mapped hardware for the time switch of the T-S-T digital switching network 10. It receives asynchronous peripheral processor accesses under software control. Control and sense information are passed to and from the LCI 104 on a two bit parallel bidirectional bus. The C/S data lead conveys control and sense data to the ringing signal circuit of the present invention.

The ringing signal control circuit includes an address decoder 200 and a multiplexer 250, that are connected to a four bit address bus. Multiplexer 250 is arranged to receive the signal leads from other functional groups of the LCI 104 and only those leads associated with the present invention are shown for matters of clarity. The type of access information, that is, data that controls the LCI 104 and sense data that the peripheral processor reads from the LCI 104, is determined by the four bit address and the card enable signal CEN. For example, an address having the binary number value of 1000, with signal CEN enabled would address decoder 200 to set ringing register 220. Since the C/S data lead is bidirectional, signal RPL applied to transceivers 230 and 240 controls the direction of the information traveling on the C/S data lead. Thereby, allowing the reading of signals RINGSNS from the multiplexer 250 (sense data) by the peripheral processor.

The ringing signal control circuit further includes a ring timing circuit 210 that receives hardware ring trip signal RINGTRIP and ringing signal activation signal RINGSNS from ringing register 220. Signal RINGTRIP is developed in HVLI 101 when the subscriber instrument goes "off-hook" during a ringing cycle or a ring trip condition is sensed on the subscriber loop.

The ringing register 220 controls the activation and termination of the ringing signal function of the enhanced SLIC. Once the ringing register control point is set, a ringing relay is activated. Ring timing 210 provides circuitry that generates a signal to a triac device which is enabled approximately 20 milliseconds after the ring relay is activated, to assure that the ring relay contacts have settled. This method avoids using metal contact closure to place the ringing signals on the subscriber loop.

Ringing is removed from the line by either a hardware ring trip from HVLI 101 or by setting a software control point. In a hardware ring trip, signal RINGTRIP is applied to ring timing circuit 210. Circuit 210 then turns off the triac via signal NTRIACEN. Approximately 40 milliseconds later the ringing relay is disabled via signal RINGRLYEN. This assures that ringing current will be removed from the line at zero voltage, thereby reducing the potential for impulse noise due to relay contact bounce.

A software turn-off clears the ringing register 220. Signal RNGSNS is then removed, disabling the ring relay and triac at the same time. Impulse noise is not an important consideration in this condition since software cuts the ring bus between the enhanced SLIC and the ringing signal generator before clearing register 220.

Figure 6:
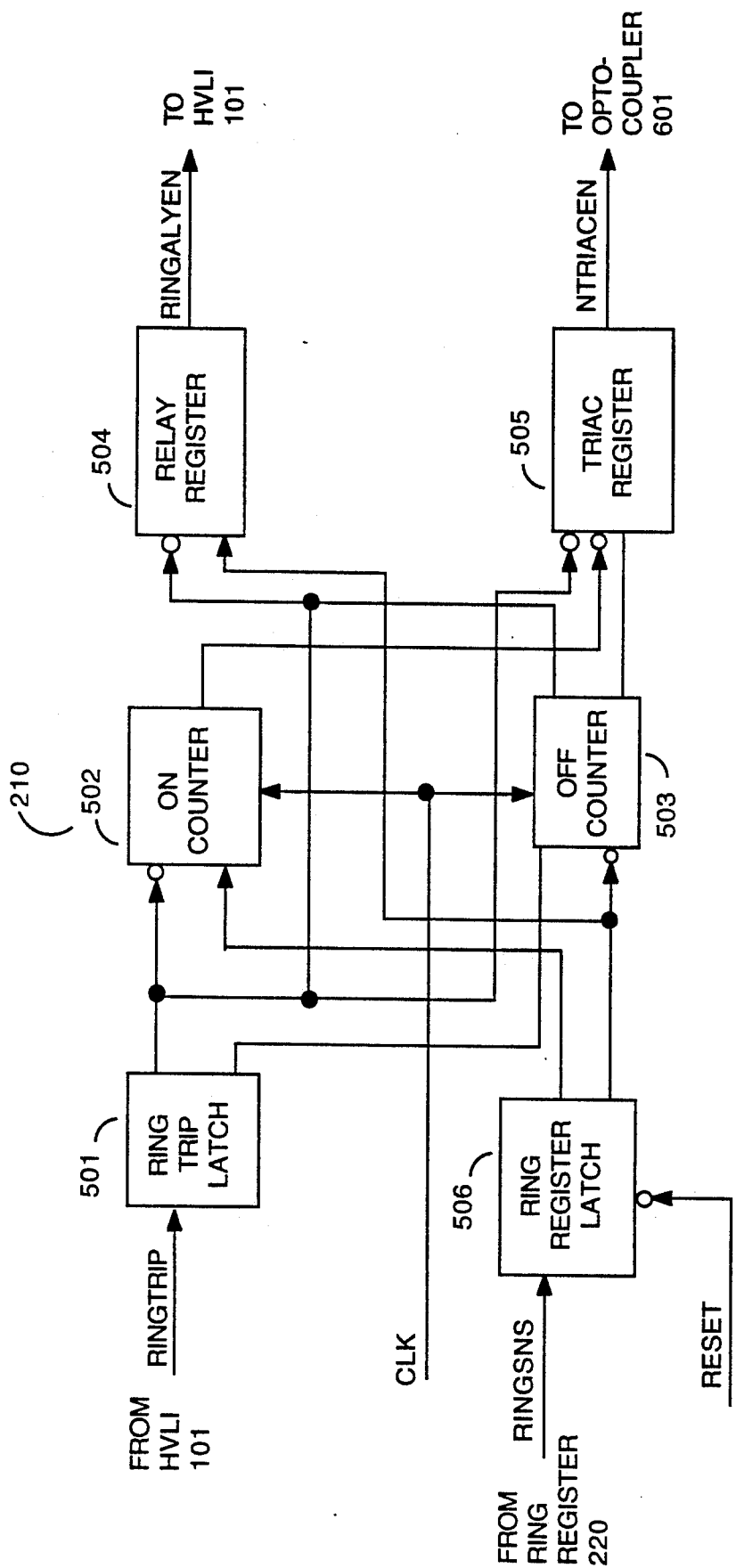
FIG. 6 is a functional block diagram of the ring timing circuit in accordance with the present invention.

Turning now to FIG. 6 of the included drawings the ring timing circuit of the present invention is shown. The ring timing circuit 210 includes a ring trip latch 501, connected to an on counter 502, an off counter 503, and a triac register 505. A ring register latch 506 is connected to on counter 502, off counter 503, and a relay register 504. The off counter 503 is connected to the relay register 504, and the triac register 505.

Figure 7:
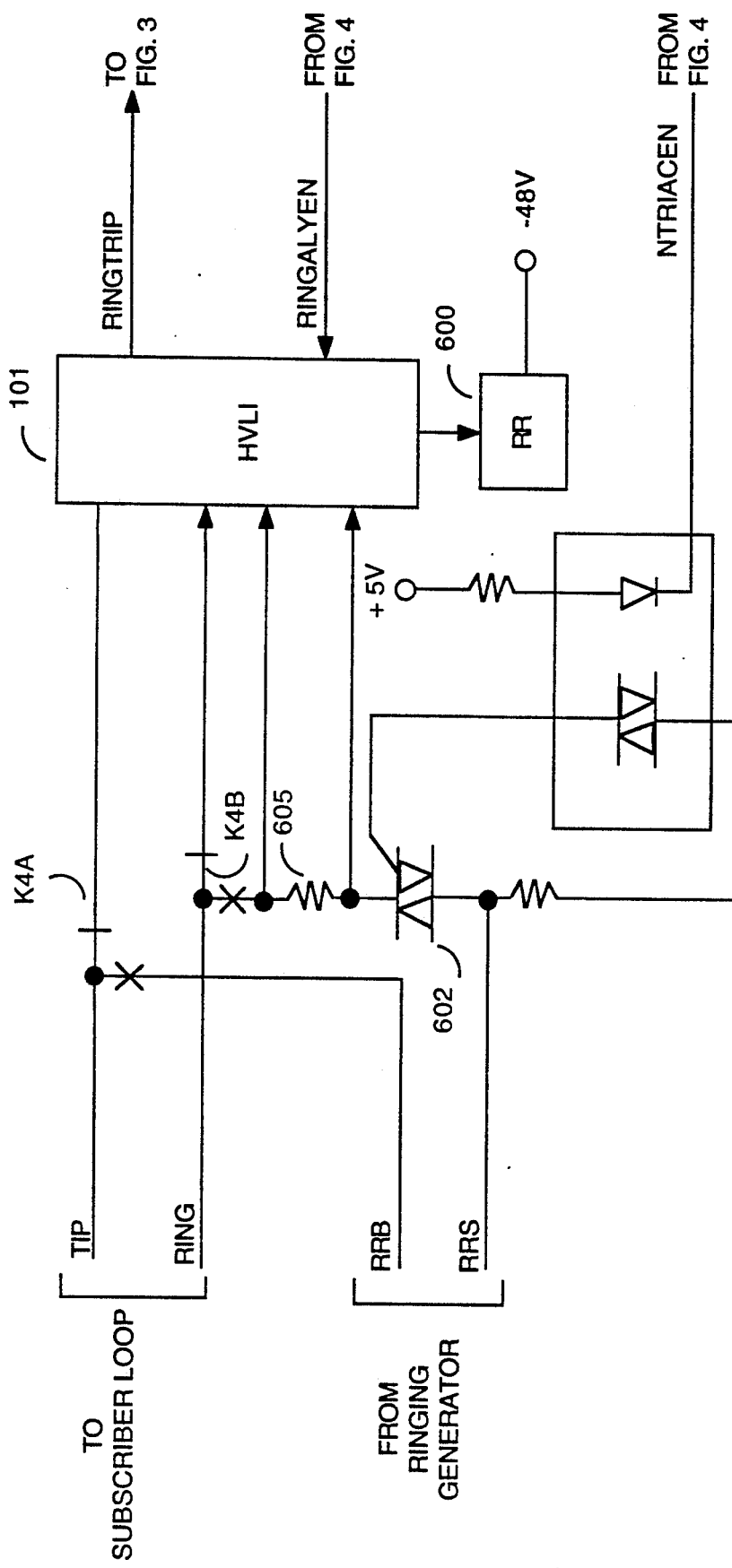
FIG. 7 is a block diagram showing the manner in which ringing current is applied and deactivated from the tip and ring leads of the subscriber loop.

When software sets ring register 220 a positive logic signal RNGSNS is transmitted and stored in ring register latch 506. This immediately sets relay register 504 and holds the off counter 503 clear. Relay register 504 then outputs signal RINGRLYEN to HVLI 101. As shown in FIG. 7, signal RINGRLYEN is then output from HVLI 101, activating ring relay (RR) 600. RR 600 breaks the tip and ring leads to HVLI 101, connecting ring bus leads RRB and RRS to the subscriber loop via RR 600 contacts K4A and K4B. A complete path to the ring lead from the ringing generator is not made yet since triac 602 is still held in a non-conductive state.

On the setting of ring register latch 506, the on counter 502 is enabled and begins to count to five. With a 250 Hz clock the count takes approximately 20 milliseconds to complete. When the count of five is reached the triac register 505 is cleared. Negative logic signal NTRIACEN is then transmitted to optical coupler 601, causing optical coupler 601 to conduct. Optical coupler 601 then turns on triac 602 which finally connects ringing bus lead RRS to the ring lead of the subscriber loop, thereby, completing the connection of the ring bus to the subscriber loop.

With reference to FIG. 7, the manner in which the invention disables the ring relay 600, when a hardware ring trip is sensed will now be explained. When a subscriber station goes "off-hook", such as when the subscriber station handset is lifted off the station cradle, a dc circuit is formed from the ring bus lead RRB the tip lead, ring lead of the subscriber loop and the RRS lead of the ring bus. When this happens a dc current from the battery biased ringing generator is drawn through the subscriber loop. This hardware ring trip is detected by resistor 605, connected in series with the ring lead. Resistor 605 develops a voltage that is proportional to the applied dc current. This voltage is coupled into HVLI 101 where it is sensed, and signal RINGTRIP is developed. Signal RINGTRIP is then transmitted to ring timing circuit 210, shown on FIG. 3. Signal RINGTRIP is coupled into ring timing circuit 210 and sets ring trip latch 501. Ring trip latch 501 immediately clears triac register 505 and on counter 502. When triac register 505 clears, signal NTRIACEN becomes logic high. This turns-off optical coupler 601, which in turn turns-off triac 602, breaking the RRS lead of the ring bus. Additionally, the off counter 503 is enabled to begin counting. After a count of ten is reached (approximately 40 milliseconds) the relay register is cleared which releases RR 600, finally disconnecting the ring bus from the subscriber loop and reconnecting the subscriber loop to HVLI 101. It should be noted that ring register latch 506, is not cleared and the ring trip latch 501 remains set even though the triac 602 and the RR 600 are inactive. The ring register must be cleared by a hardware reset, that forces signal RESET low, or a software ringing termination command must be issued before the ringing function can be used again.

Software can also terminate ringing. By issuing the proper control point address to address decoder 200 data on the C/S lead is loaded into ringing register 220 to clear ringing register 220. Signal RNGSNS is then changed to a logic low signal clearing the relay register 504, the ring trip latch 501, and the triac register 505. This causes both the triac 602 and RR 600 to deactivate approximately at the same time. As mentioned earlier, impulse noise due to relay contact bounce is not of critical importance in a software ring trip since software had deactivated the ring bus between the enhanced SLIC and the ringing generator before issuing the software ring trip command.

Software can ascertain ringing signal activation and termination by addressing the multiplexer and reading the status of signal RNGSNS via the bidirectional data lead C/S.

Figure 8:
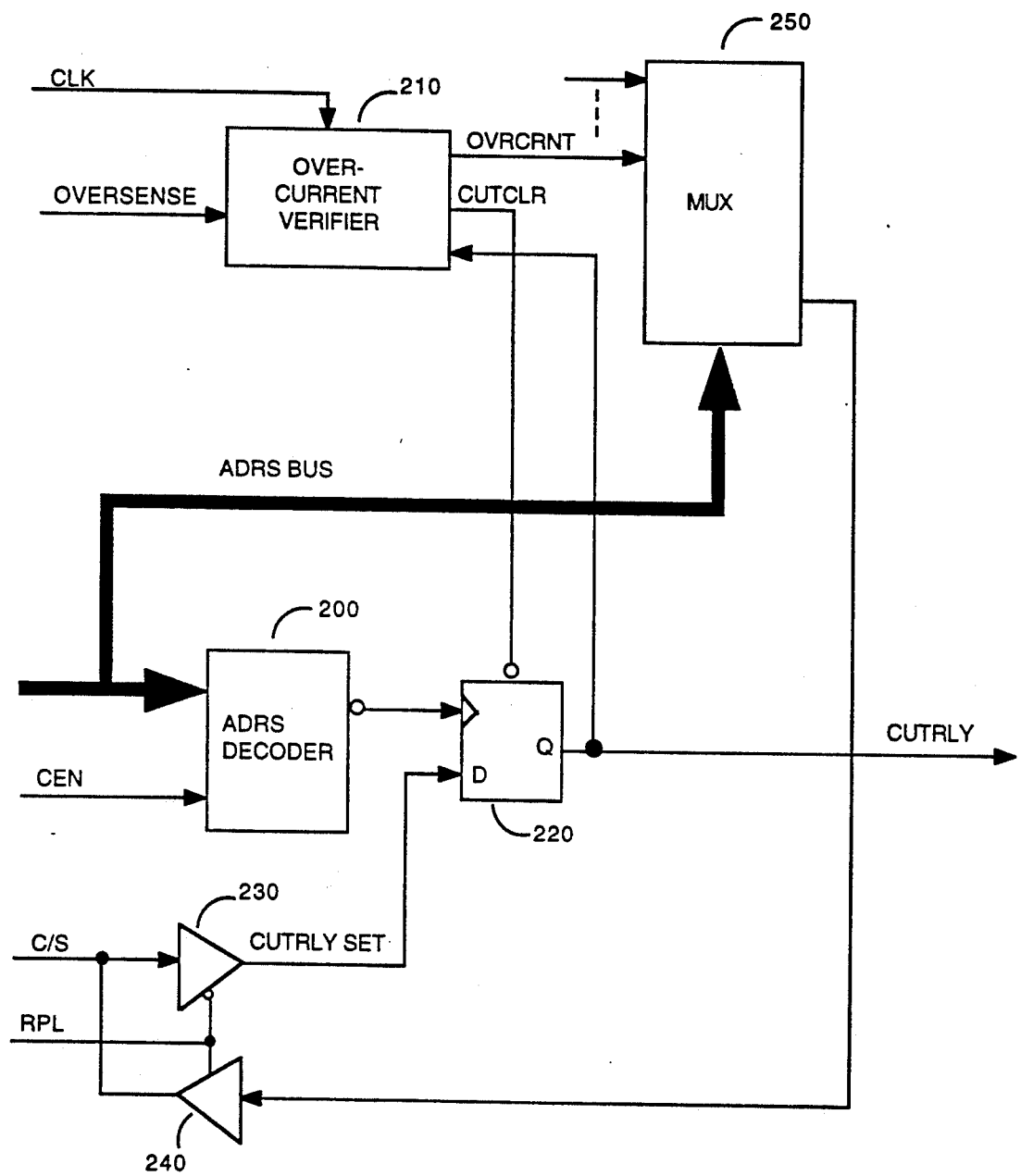
FIG. 8 is a block diagram of one of the two over-current sense circuits residing in the line control interface of the enhanced SLIC in accordance with the present invention.
Figure 9:
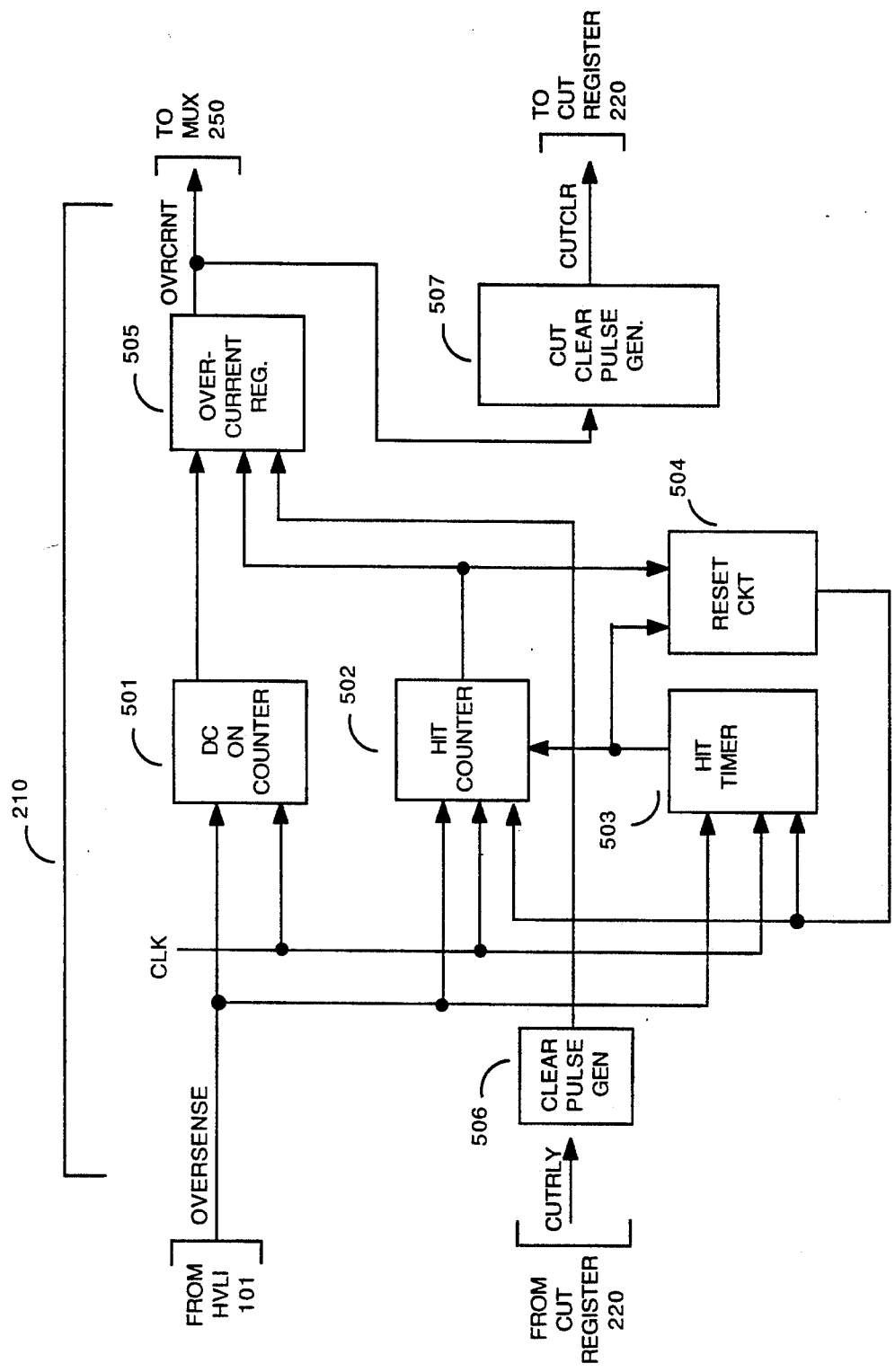
FIG. 9 is a block diagram of the over-current detector circuit in accordance with the present invention.

A more detailed explanation of the over-current detector circuit of LCI 104 may be had by reference to FIGS. 8 and 9.

Turning now to FIG. 8, of the included drawings, one copy of the two over-current circuits found within LCI 104 is shown. LCI 104 is essentially memory mapped hardware for the time switch of the T-S-T digital switching network 10. It receives asynchronous peripheral processor accesses under software control. Control and sense information is passed to and from the LCI 104 on a two bit (one bit per line circuit) parallel bidirectional bus. The data lead which conveys control and sense data to the over-current circuit of the present invention is shown in FIG. 8 as C/S.

The over-current circuit includes an address decoder 200 and a multiplexer 250, that are connected to a four bit address bus. The type of access information, that is, data that controls the LCI 104 and sense data that the peripheral processor reads from the LCI 104, is determined by the four bit address and the card enable signal CEN. For example, an address of 0011 would address the multiplexer 250 to allow the peripheral processor to read or sense if an over-current condition exists. An address of 1011 with signal CEN enabled would enable address decoder 200 and prepare cut register 220 for the input of data from the C/S data lead. Since the C/S data lead is bidirectional, signal RPL applied to transceivers 230 and 240 controls the direction of the information traveling on the C/S data lead. Thereby, allowing the reading of signal OVRCRNT from the multiplexer 250 (sense data) or the input of a control data bit (control data) to the cut register 220. The over-current circuit further includes an over-current detector circuit 210 connected to HVLI 101. Signal OVERSENSE is developed in HVLI 101 when an over-current condition is sensed on the subscriber loop. OVERSENSE is then coupled into detector 210 where it is tested to ascertain if the over-current condition is valid. The circuit tests for both dc and ac over-current conditions and if a valid condition exists, produces signal OVRCRNT. Signal OVRCRNT is coupled to multiplexer 250 for transmission to the peripheral processor.

Simultaneously, signal OVRCRNT is also coupled into cut register 220. Signal OVRCRNT clears cut register 220, deactivating a cut relay (not shown) which is subscriber loop. This immediately removes the over-current condition and prevents damage to HVLI 101. Once the over-current sense point is set, it will remain set until software writes a control bit to the cut register 220, reactivating the cut relay.

Turning now to FIG. 9 of the included drawings the over-current detector circuit of the present invention will be explained. The over-current detector 210 is connected to HVLI 101 via the OVERSENSE signal lead. OVERSENSE is connected to a dc on counter 501, a hit counter 502 and a hit timer 503. Counters 501, 502 and timer 503 are used to determine the validity of the OVERSENSE signal received from HVLI 101. The dc on counter 501 and the hit counter 502 are connected to over-current register 505 where valid over-current signals are latched. Once set, circuit 505 produces output signal OVRCRNT. Signal OVRCRNT is then transmitted to multiplexer 250 and cut clear pulse generator 507. Cut clear pulse generator 507 produces a CUTCLR pulse when a valid over-current condition is sensed. This clear pulse is applied to cut register 220. Clear pulse generator 506 is arranged to clear overcurrent register 505 when cut register 220 is set by software.

With renewed reference to FIG. 9 an explanation of the manner in which the present invention operates will now be given. The circuit of the present invention can detect both dc and ac over-current conditions. For a dc over-current, dc on counter 501 is held clear as long as there is no over-current indicated from HVLI 101. A low logic input on OVERSENSE removes the clear and enables dc on counter 501 to begin counting. Counter 501 is clocked with a 250 Hz clock signal from the CLK input. If OVERSENSE remains low for 15 counts (56 milliseconds), then the over-current register 505 is set, producing signal OVRCRNT. Additionally, OVRCRNT is applied to cut clear pulse generator 507 where a pulse CUTCLR is generated and transmitted to cut clear register 220. The CUTCLR pulse clears register 220 and opens the subscriber loop via a cut relay (not shown). Once the over-current register 505 is set it will remain set until software writes a positive logic data bit into cut register 220. The transition of signal CUTRLY from a low logic level to a high logic level signal causes the clear pulse generator 506 to produce a clear pulse to the over-current register 505, thereby, clearing register 505.

The detection of an ac over-current condition works in a similar fashion. A low logic signal at OVERSENSE enables the hit timer 503 to begin counting. A high to low transition of the OVERSENSE input also causes the hit counter 502 to register one hit. Each subsequent low pulse on OVERSENSE will cause the hit counter 502 to advance. If three hits are registered before the hit timer 503 reaches a count of 15 (56 milliseconds minimum), then it is considered a valid ac over-current and the over-current register 505 is set. However, if the hit timer 503 reaches a count of 15 before the hit counter 502 reaches a count of three, then the hit counter and hit timer are reset by the reset circuit 504 and the next pulse on OVERSENSE will restart the ac detection sequence. The interaction between the over-current register 505 and the cut register 220 remains the same whether it is a dc or an ac over-current condition.

Returning again to FIG. 2, digital logic buffers 105 transmit data from the HCOMBO 101 of XBRID module 100, to the PCM bus of the network, and conversely, receive PCM data from the network PCM bus to a respective HCOMBO 102 via CODEC Control circuit 106. CODEC Control circuit 106 is an octal Time Slot Assigner Circuit (TSAC) device that functions to generate transmit and receive frame sync pulses to its connected HCOMBO devices 102. One TSAC 106 connects to all eight HCOMBOs of the line card. The network provides a required 1.544 MHz clock with a nominal 50% duty cycle for the purpose of shifting PCM data in and out of the HCOMBO 102 data registers. A frame (125 $\mu$sec) provides for 24 eight bit PCM channels with one framing bit for synchronization. One such TSAC device is the TP3155 Time Slot Assigner Circuit manufactured by the National Semiconductor Corporation.

As can be seen in FIG. 2, the four XBRID modules 100 on the line card, include eight SLIC circuits that via each SLICs associated LCP 103 connect to eight subscriber lines. Further, each of the four LCI 104 circuits is connected via a control and sense bus to an associated XBRID module 100 and the HVLI 101 and HCOMBO 102 pair. Still further, a single CODEC controller 106 connects to all eight HCOMBO devices 102 via a PCM and CODEC data bus, allowing the CODEC controller 106 to control the PCM time slot allocation for each of the eight SLICs. Finally, the PCM data and control and sense data is transmitted to the digital switching network 10 via the TTL buffers 105 and the network bus.

As can be appreciated from the above organizational description of the line card architecture, any destructive voltages or currents induced into a subscribers line and which are not blocked by the protection circuitry of the LCP 103 would damage only the effected XBRID 100. Repair of the damaged SLIC would entail the replacement of the damaged XBRID module 100 only. Further, it can be appreciated by those skilled in the art that the XBRID modules 100 can be manufactured as plug-in devices easily allowing the removal and replacement of the XBRID modules 100 on the line card.

Furthermore, it will be obvious to those skilled in the art that numerous modifications to the present invention can be made without departing from the scope of the invention as defined by the appended claims. In this context, it should be recognized that the essence of the invention resides in a new and more effective SLIC architecture that can effectively and efficiently interface the digital switching network of a central office exchange to analog subscribers lines.

What is claimed is:

1. A subscriber line interface circuit for a digital switching system over which a connection is established between said digital switching system and a subscriber instrument via a subscriber line, comprising:

a line configuration and protection circuit connected to said subscriber line, said line configuration and protection circuit including destructive voltage protection means for protecting said subscriber line interface circuit from destructive voltages induced onto said subscriber line;

at least a first high voltage interface circuit connected to said line configuration and protection circuit and to a source of high voltage potential, said first high voltage interface circuit including means for providing power from said source of high voltage potential to said subscriber line, differential voltage means arranged to convert received analog voice signals transmitted from said subscriber instrument to differential voltage voice signals, detector means for monitoring the status of said subscriber line; and at least a first PCM conversion circuit connected to said first high voltage interface circuit and to a source of voltage potential substantially less than said source of high voltage potential, said first PCM conversion circuit arranged to receive said differential voice signals and to convert said differential voice signals to PCM digital signals;

a line control interface circuit connected to said digital switching system via a control bus, and to said first high voltage interface circuit and said first PCM conversion circuit, said line control interface circuit arranged to receive control signals from a peripheral processor of said digital switching system and to control the operation of said first high voltage interface circuit and said first PCM conversion circuit, and alternatively said line control interface circuit arranged to receive status information from said detector means and to convey said status information to said peripheral processor over said control bus, said line control interface circuit further receiving said PCM digital signals from said first PCM conversion circuit; and a time slot assignment circuit connected to said line control interface circuit, said control bus, and to a PCM bus of said digital switching system, said time slot assignment circuit connecting said PCM digital signals from said line control interface circuit to said PCM bus for transmission to said digital switching system, and said time slot assignment circuit further arranged to receive control information from said peripheral processor and to generate PCM time slot synchronization signals for operating said first PCM conversion circuit.

2. A subscriber line interface circuit as claimed in claim 1, wherein said time slot assignment circuit connects PCM digital signals from said digital switching system PCM bus to said line control interface circuit, and said PCM digital signals are transferred to said first PCM conversion circuit, whereby, said first PCM conversion circuit converts said PCM digital signals into differential voice signals which are input to said differential voltage means and converted to analog voice signals for transmission along said subscriber line to said subscriber instrument.

* * * * *